United States Patent [19]

Sprey

[11] 4,186,261

[45] Jan. 29, 1980

[54] ELASTOMERIC POLYURETHANE COMPOSITIONS AND SEALS

[75] Inventor: Raymond E. Sprey, Manchester, N.H.

[73] Assignee: Disogrin Industries Corporation, Manchester, N.H.

[21] Appl. No.: 912,836

[22] Filed: Jun. 5, 1978

Related U.S. Application Data

[63] Continuation of Ser. No. 757,095, Jan. 5, 1977, abandoned.

[51] Int. Cl.² .................. C08G 18/67; C08G 18/76; B65D 53/06
[52] U.S. Cl. .................. 528/75; 220/81 R; 277/DIG. 6
[58] Field of Search .......... 528/75; 277/DIG. 6; 220/81 R

[56] References Cited

U.S. PATENT DOCUMENTS

| | | | |
|---|---|---|---|
| 3,100,759 | 8/1963 | Boussu et al. | 260/77.5 AP |
| 3,129,200 | 4/1964 | Müller et al. | 528/75 |
| 3,192,185 | 6/1965 | Achterhof et al. | 528/75 |
| 3,654,347 | 4/1972 | Kincaid et al. | 528/75 |
| 3,723,392 | 3/1973 | Konig et al. | 260/77.5 AP |
| 3,775,354 | 11/1973 | Hostettler et al. | 260/77.5 An |
| 3,834,578 | 9/1974 | Smith et al. | 260/77.5 AM |
| 3,899,467 | 8/1975 | Bonk et al. | 260/77.5 AN |

OTHER PUBLICATIONS

Wright et al., Solid Polyurethane Elastomers, Maclaren & Sons, London (1969), pp. 239–242, 260–264 and Plate 10.

*Primary Examiner*—H. S. Cockeram
*Attorney, Agent, or Firm*—Pennie & Edmonds

[57] ABSTRACT

This invention relates to improved elastomeric polyurethane compositions and seals which show increased resistance to the degrading effects of contact with fluids containing phosphate esters relative to conventional polyurethane elastomers. The elastomeric composition includes the reaction product of 3,3'-dimethyl-4,4'-diphenyl diisocyanate; one or more polycaprolactone polyols; and a chain extender which includes a linear aliphatic compound defining a chain of carbon atoms which includes at least one unsaturated carbon-carbon bond and which is terminated at each end with a hydroxyl group. An example of a preferred chain extender is 1,4-dihydroxy-2,3-dibromo-2-butene.

10 Claims, No Drawings

ELASTOMERIC POLYURETHANE COMPOSITIONS AND SEALS

This is a continuation, of application Serial No. 757,095, filed Jan. 5, 1977, and now abandoned.

BACKGROUND OF THE INVENTION

1. Field of the Invention

This invention pertains, in general, to improved polyurethane elastomer compositions which are used in contact with phosphate-ester-based hydraulic fluids.

2. Description of the Prior Art

The term "polyurethane elastomers" is generally applied to elastomeric or rubberlike polymers which contain significant numbers of urethane groups, which have the characteristic structure

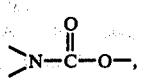

whether the urethane group repeats regularly throughout the macromolecule or not. Such elastomers are ordinarily prepared by the reaction of a polyisocyanate compound with compounds having two or more "active hydrogens." Such active-hydrogen compounds include polyhydroxy compounds, generally termed polyols, and compounds containing amino groups or carboxyl groups. The active hydrogen compound can contain functional groups in addition to groups which supply replaceable hydrogens. Thus hydroxyl-terminated polyethers and polyesters have been used to react with polyisocyanates to prepare polyurethanes, as have polycaprolactone polyols, which contain both ester and ether groups in addition to hydroxyl groups. A detailed discussion of prior-art polyurethane compositions may be found in Kirk-Othmer, Encyclopedia of Chemical Technology, 2nd ed., (Interscience, 1970), Vol. 21, pp. 56-106.

Generally in commercial practices a "prepolymer" technique is utilized to prepare polyurethane elastomers, in which a diisocyanate is reacted with a polyol, usually a hydroxyl-terminated polyester or polyether, to form an isocyanate-terminated prepolymer. The polyols used in forming the polyurethane elastomers generally have molecular weights in the range of about 1,000 to about 3,000. The diisocyanates employed are ordinarily aromatic compounds, because their bulky molecular structure contributes rigidity and tensile strength to the polymer. Two aromatic diisocyanates commonly used in the preparation of polyurethane elastomers are 4,4'-diphenylmethane diisocyanate, designated MDI, and 3,3'-dimethyl-4,4'-diphenyl diisocyanate, designated TODI. A partial listing of other aromatic diisocyanates particularly useful in the preparation of polyurethane elastomers is set forth in Table 16, page 77 of Kirk-Othmer, cited above. During the prepolymer formation step the molecular weight of the material is increased to the range of 25,000 to 50,000.

This prepolymer is then further reacted with a second active-hydrogen compound, ordinarily of lower molecular weight than the polyol used to prepare the prepolymer. This second step is referred to as a "chain extension" reaction, and the second active-hydrogen reactant is termed a "chain extender." Glycol (1,2 ethanediol); 1,4 butanediol; diamines; and trihydroxy compounds have been used as chain extenders. The chain extension reaction causes the segments of prepolymer to join together to produce a very high molecular weight linear material. Chain extension normally does not provide any cross-linking. However, if a trihydroxy compound such as trimethyolpropane is used for chain extension, branching of the polymer will occur.

The above steps are usually carried out at elevated temperatures in the vicinity of about 100° C. and may or may not be catalyzed.

Up to this point the polyurethane polymer exists mainly as a very high molecular weight polymeric material. In order to provide the final physical properties associated with a thermoset elastomeric material, the polymer must be crosslinked. This is accomplished by joining the long polymer chains together through the reaction of free (unreacted) diisocyanate groups on one macromolecule with urethan and/or substituted urea groups on another macromolecule to form allophanate and/or biuret cross-links respectively.

In addition to the prepolymer method discussed above for preparing polyurethane elastomers, a "one-shot" technique is also sometimes used. The one-shot method involves mixing active-hydrogen compounds of different molecular weights and reacting the resultant mixture with a polyisocyanate.

Within the polyurethane elastomer family, it is possible to obtain a wide range of values for the physical and chemical properties of the elastomer by appropriate selection of the specific raw materials, their formulation, or their relative amount within the formulation, as is well known in the art.

Conventional polyurethane elastomers have advantages not possessed by other elastomeric materials; namely: (1) excellent abrasion resistance; (2) higher tear strength; (3) high tensile modulus; (4) high tensile strength at break; (5) outstanding toughness; (6) excellent resistance to oxygen and ozone; and (7) excellent resistance to mineral oil.

Because of their overall good abrasion resistance, high coefficient of friction, low noise level, and particularly their excellent resistance to mineral oils, polyurethane elastomers have found wide use as gaskets, wiper rings, valve seats, and other such seals in hydraulic systems which employ mineral-oil hydralic fluids.

Seals for hydraulic systems made of conventional polyurethane elastomers, however, suffer a serious limitation which has become increasingly important in recent years. Because of the fire hazard which attends the use of mineral-oil hydraulic fluids, users and manufacturers of hydraulic systems often employ phosphate-ester hydraulic fluids in place of mineral oils. Phosphate esters, however, attack conventional polyurethane elastomeric materials, causing them to swell and lose strength. A conventional polyurethane-elastomer seal in contact with a phosphate-ester hydraulic fluid will weaken and have a substantially shortened useful life compared to the same seal in contact with a mineral-oil hydraulic fluid. In high-pressure hydraulic systems employing phosphate-ester hydraulic fluids, there is a significant risk that a seal made of a conventional polyurethane elastomer will fail catastrophically.

Other elastomeric materials, such as certain highly fluorinated polymers, are available which can withstand attack by fluids containing phosphate esters, but generally these materials are significantly more expensive than conventional polyurethane elastomers and, moreover, have a lower abrasion resistance.

I have invented an elastomeric polyurethane composition which is highly resistant to fluids containing phosphate esters, yet retains without significant impairment the advantages of conventional polyurethane elastomers. This composition is particularly adapted for use in fabricating elastomeric seals which avoid the problems associated with conventional polyurethane elastomeric seals in contact with phosphate-ester hydraulic fluids.

SUMMARY OF THE INVENTION

This invention relates to an improved elastomeric polyurethane composition which is resistant to fluids containing phosphate esters, such as phosphate-ester hydraulic fluids. The composition includes the reaction product of 3,3'-dimethyl-4,4'-diphenyl diisocyanate (TODI), one or more polycaprolactone polyols, and a chain extender which includes a linear aliphatic compound defining a chain of carbon atoms, each end of the chain being attached to a hydroxyl group, and the chain having an unsaturated carbon-carbon bond.

A preferred chain extender of the present invention, particularly for applications in which the elastomeric polyurethane composition will not contact mineral oils, is 1,4-dihydroxy-2,3-dibromo-2-butene. A second chain extender, preferred for applications in whch resistance to both mineral oils and phosphate esters is required, is a mixture of 1,4-butanediol and 1,4-dihydroxy-2,3-bibromo-2-butene. For example, a mixture of about 12 percent by weight 1,4-butanediol and about 88 percent by weight 1,4-dihydroxy-2,3-dibromo-2-butene used as a chain extender in the present invention lead to an elastomeric polyurethane composition with excellent resistance to both mineral-oil and phosphate-ester hydraulic fluids.

The present invention further relates to an elastomeric seal which is resistant to fluids containing phosphate esters. The seal is made of an elastomeric polyurethane composition of the present invention. Seals of the present invention may be incorporated to advantage in hydraulic machines to seal reservoirs, lines, and other containers of hydraulic fluids containing phosphate esters.

DETAILED DESCRIPTION OF PREFERRED EMBODIMENTS

Elastomeric polyurethane compositions of the present invention can be synthesized by substantially the same techniques as conventional polyurethane elastomers. The two-step prepolymer method is ordinarily preferred for preparing the composition, although it is contemplated that for some applications it may be advantageous to premix the polycaprolactone polyol with the chain extender before reacting the mixture with the diisocyanate in a one-shot process. Other sequences of reaction steps may also be used to prepare the composition.

One ingredient used to synthesize elastomeric polyurethane compositions of the present invention is 3,3'-dimethyl-4,4'-diphenyl diisocyanate (TODI), which is commercially available.

Polycaprolactone polyols are generally made by reacting an ε-caprolactone with an initiator such as diethylene glycol (2,2'-oxydiethanol). Polycaprolactone polyols of various molecular weight distributions are commercially available. Preferred polycoprolactone polyols for the present invention have molecular weights in the range of from 1,000 to 3,000.

Preferred chain extenders for the present invention include one or more of the following compounds: 1,4-dihydroxy-2-butene; 1,4-dihydroxy-2-butyne; and 1,4-dihydroxy-2,3-dibromo-2-butene. Any of these compounds can be used alone or mixed with a conventional chain extender. Significantly, each of these three preferred chain extenders is a hydroxyl-terminated linear aliphatic compound which includes a double bond or a triple bond between two carbon atoms in the chain. The ratio of the effective equivalent weight of such hydroxyl-terminated, unsaturated compound or mixture of such compounds to the equivalent weight of the diisocyanate TODI preferably lies in the range of from about 0.3 to about 0.9.

As will be recognized by those skilled in this art, the elastomeric polyurethane composition of the present invention can include stabilizers, plasticizers, pigments, fillers, extenders, and the like in addition to the reaction product of the ingredients set forth above.

The elastomeric polyurethane compositions can be cast and formed by conventional methods. Thus elastomeric seals of the present invention such as gaskets, wiper rings, and valve seats are preferably manufactured by the same techniques as are used to fabricate seals from conventional polyurethane elastomers.

EXAMPLES

Example 1

Two samples of elastomeric polyurethane compositions were prepared: a control sample of a conventional polyurethane elastomer, designated A, and a test sample of a elastomeric polyurethane composition of the present invention, designated B.

Table I lists the ingredients and proportions (in parts by weight) used.

Table I

| Ingredient | Proportion (parts by weight) | |
|---|---|---|
| | Sample A | Sample B |
| "Niax Diol D-560" | 100 | 100 |
| TODI | 48 | 48 |
| 1,4-butanediol | 10.26 | — |
| 1,4-dihydroxy-2,3-dibromo-2-butene | — | 27.8 |

"Niax Diol D-560" is the trade name of a polycaprolactone polyol having a mean molecular weight of about 2000 sold by Union Carbide Corporation. TODI designates 3,3'-dimethyl-4,4'-diphenyl diisocyanate.

Sample B, the test sample, was prepared according to the following procedure. The polycaprolactone polyol was dehydrated by melting and heating it with stirring under a vacuum of about 10–20 Torr. After dehydration, the polycaprolactone polyol was heated to 148° C., the diisocyanate TODI was added, and the resultant mixture was stirred for 15 minutes under a vacuum to form a prepolymer. The temperature of the prepolymer was then adjusted to 120° C. and the chain extender 1,4-dihydroxy-2,3-dibromo-2-butene was stirred in. Standard test specimens were formed by casting this mixture in a steel mold heated to 125° C. After the specimens solidified, they were cured for 48 hours in an oven maintained at 100° C.

Test specimens of the contrl sample A were prepared by the same procedure, except that the chain extender 1,4-butanediol was substituted for 1,4-dihydroxy-2,3-dibromo-2-butene.

To compare the physical properties of these two samples, a series of standard tests were run which are commonly used in the polyurethane industry to characterize polyurethane elastomers. The results of the tests are set forth in Table II below.

Table II

| Test | Units or Symbol | Sample A | Sample B |
|---|---|---|---|
| Hardness (Shore A) | points | 93/40 | 96/45 |
| Tensile Strength | psi | 4322 | 2075 |
| Elongation | percent | 463 | 381 |
| Elongation Set | percent | 22 | 80 |
| 25% Modulus | psi | 1103 | 1283 |
| 50% Modulus | psi | 1225 | 1351 |
| 100% Modulus | psi | 1402 | 1496 |
| 200% Modulus | psi | 1802 | 1736 |
| 300% Modulus | psi | 2418 | 1938 |
| Tear Strength (C, Nicked) | PLI | 389 | 338 |
| Tear Strength (Die C) | PLI | 693 | 525 |
| Resilience | percent | 31 | 35 |

The tensile, elongation, and modulus measurements were carried out on a ring specimen 52.6 mm OD×44.6 mm ID×3.2 mm thick. The samples were tested using an x head speed of 20 in./min. Tear measurements were made according to the procedures of ASTM test D-624.

To compare the compatibility of the two samples to phosphate esters, specimens of each were submerged for 168 hours at about 70° C. in a typical phosphate-ester hydraulic fluid, "Pydraul 50-E" sold by Monsanto Company. Table III lists the changes in three significant physical properties after submergence in the phosphate ester hydraulic fluid.

Table III

| Test | Units or Symbol | Sample A | Sample B |
|---|---|---|---|
| Increase in Volume | percent | +16 | +8.4 |
| Decrease in Hardness (Shore A) | points | −4 | −2 |
| Loss in Tear Strength (Die C) | percent | −30 | 0 |

The compatibility tests were performed using Die C tear specimens as described in ASTM test D-624 and the procedure specified in ASTM test D-471.

As demonstrated by Table III above, the control sample A exhibited a greater degree of swelling, more reduction of hardness, and a greater loss of tear strength then test Sample B after extended exposure to a phosphate ester hydraulic fluid. In fact, the sample of elastomeric polyurethane composition of the present invention exhibited no loss of tear strength after contact with the fluid. Thus the elastomeric polyurethane composition of Sample B is proven to be more resistant to phosphate-ester hydraulic fluids than the conventional polyurethane elastomer of Sample A.

EXAMPLE 2

Five batches of polyurethane elastomer were prepared according to the procedure set forth in Example 1, except that the relative proportions of 1,4-butanediol and 1,4-dihydroxy-2,3-dibromo-2-butene in the chain extender were varied between 0 and 100 mole percent in 25 mole percent increments. The reaction ingredients and proportions in parts by weight are set forth in Table IV below.

Table IV

| Ingredient | Proportion (parts by weight) Sample | | | | |
|---|---|---|---|---|---|
|  | C | D | E | F | G |
| "Niax Diol D-560" | 100 | 100 | 100 | 100 | 100 |
| TODI | 48 | 48 | 48 | 48 | 48 |
| 1,4-butanediol | 10.2 | 7.6 | 5.05 | 2.5 | 0 |
| 1,4-dihydroxy-2,3-dibromo-2-butene | 0 | 6.9 | 13.8 | 20.8 | 27.6 |
| "Staboxol I" | 0 | 0 | 0 | 0 | 1 |

"Staboxol I" is an additive for polyurethane sold by Farbenfabriken Bayer A. G. and identified as a carbodumide.

The physical characteristics of these five samples are set forth in Table V below. The test procedures were the same as those set forth in Example 1. Sample C, whose chain extender is pure 1,4-butanediol, was the control sample.

Table V

| Test | Units or Symbol | Results | | | | |
|---|---|---|---|---|---|---|
|  | Sample | C | D | E | F | G |
| Hardness (Shore A) | points | 89 | 87 | 89 | 93 | 95 |
| Tensile Strength | psi | 3137 | 3216 | 4983 | 3870 | 3621 |
| Elongation | percent | 367 | 319 | 368 | 353 | 402 |
| Elongation Set | percent | 13 | 6 | 9 | 15 | 43 |
| 25% Modulus | psi | 829 | 748 | 814 | 977 | 1261 |
| 50% Modulus | psi | 937 | 814 | 917 | 1067 | 1305 |
| 100% Modulus | psi | 1142 | 986 | 1140 | 1289 | 1439 |
| 200% Modulus | psi | 1507 | 1494 | 1679 | 1778 | 1800 |
| 300% Modulus | psi | 2196 | 2803 | 2798 | 2834 | 2475 |
| Tear Strength (C., Nicked) | PLI | 324 | 185 | 203 | 277 | 374 |
| Tear Strength (Die C) PLI | | 568 | 462 | 519 | 548 | 617 |
| Resilience | percent | 30 | 35 | 36 | 37 | 30 |
| Spec. Gravity | — | 1.17 | 1.19 | 1.22 | 1.24 | 1.26 |

The compatibility of these samples with the phosphate-ester hydraulic fluid "Pydraul 50-E" was tested by immersing specimens formed from the samples in the fluid for 168 hours at 70° C. The changes induced by this treatment are set forth in Table VI.

Table VI

| Test | Units or Symbol | Results | | | | |
|---|---|---|---|---|---|---|
|  | Sample | C | D | E | F | G |
| Increase in Volume | percent | +21 | +21 | +21 | +17 | +11 |
| Decrease in Hardness (Shore A) | points | −4 | −3 | −4 | −3 | −2 |
| Loss of Tear Strength (Die C) | percent | −35 | −31 | −25 | −27 | −14 |

As can be seen from Table VI above, any 1,4-dihydroxy-2,3-dibromo-2-butene in the chain extender is beneficial, and substantial resistance to deterioration caused by contact with phosphate-ester containing fluid is obtained when the two-component chain extender of this example contains greater than 25 mole percent 1,4-dihydroxy-2,3-dibromo-2-butene.

EXAMPLE 3

The following elastomeric polyurethane composition, Sample H, was prepared generally according to the procedure set forth in Example 1:

"Niax Diol D-560"   100 parts by weight
                    (28 parts by equivalent weight)

-continued

| | |
|---|---|
| TODI | 48 parts by weight |
| | (100 parts by equivalent weight) |
| 1,4-dihydroxy-2,3-dibromo-2-butene | 20.59 parts by weight |
| | (47 parts by equivalent weight) |
| 1,4-butanediol | 2.69 parts by weight |
| | (17 parts by equivalent weight) |
| "Staboxol I" | 1 part by weight. |

Specimens of this composition were immersed for 168 hours in four different hydraulic fluids, two mineral-oil based and two phosphate-ester based. The temperatures at which the hydraulic fluids were maintained during the exposure of the specimens to the fluids and the changes in volume, hardness, and tear strength induced by the exposure are set forth in Table VII.

Table VII

| Hydraulic Fluid | Temperature (°C.) | Increase in Volume (percent) | Decrease in Hardness (points) | Loss in Tear Strength (percent) |
|---|---|---|---|---|
| "Pydraul 50E" | 70 | 32 | −3 | −4 |
| "Pydraul 50E" | 100 | 35 | −4 | 0 |
| "Monsanto 230" | 70 | 26 | −2 | 0 |
| "Monsanto 230" | 100 | 28 | −3 | 0 |
| ASTM Oil #1 | 70 | 0 | +1 | 0 |
| ASTM Oil #1 | 100 | 7 | −1 | 0 |
| ASTM Oil #3 | 70 | 6 | +1 | 0 |
| ASTM Oil #3 | 100 | 0 | 0 | 0 |

"Monsanto 230" is the trade name of a phosphate-ester hydraulic fluid sold by Monsanto Company. ASTM Oils #1 and 3 are standard mineral oils. The test procedures were the same as were carried out in connection with Tables III and VI above.

Table VII demonstrates that the elastomeric polyurethane composition of Sample H is resistent to both mineral-oil hydraulic fluids and phosphate-ester hydraulic fluids. Note that the hardness of the composition actually increases upon exposure to the mineral oils at 70° C.

Similar tests were carried out on the following elastomeric polyurethane composition, Sample I:

| | |
|---|---|
| "Niax Diol D-560" | 100 parts by weight |
| | (28 parts by equivalent weight) |
| TODI | 48 parts by weight |
| | (100 parts by equivalent weight) |
| 1,4-dihydroxy-2,3-dibromo-2-butene | 25.87 parts by weight |
| | (58 parts by equivalent weight). |

This composition exhibited superior resistance to phosphate esters compared to Sample H, but significantly lower resistance to mineral oils.

EXAMPLE 4

Four batches of elastomeric polyurethane composition were prepared generally according to the procedure of Example 1, except that 1,4-dihydroxy-2-butene and 1,4-dihydroxy-2-butyne were used as chain extenders in addition to the two chain extenders of Example 1. The reaction ingredients and proportions in parts by weight are set forth in Table VIII below. Equimolar amounts of chain extender were employed in the four samples.

Table VIII

| Ingredient | Proportion (parts by weight) Sample | | | |
|---|---|---|---|---|
| | J | K | L | M |
| "Niax Diol D-560" | 100 | 100 | 100 | 100 |
| TODI | 48 | 48 | 48 | 48 |
| 1,4-butanediol | 10.00 | — | — | — |
| 1,4-dihydroxy-2-butene | — | 9.69 | — | — |
| 1,4-dihydroxy-2-butyne | — | — | 9.47 | — |
| 1,4-dihydroxy-2,3-dibromo-2-butene | — | — | — | 25.87 |

Physical characteristics of these samples are set forth in Table IX below. The test procedures were the same as those set forth in Example 1. Sample J was a control sample.

Table IX

| Test | Units or Symbol | Results Sample | | | |
|---|---|---|---|---|---|
| | | J | K | L | M |
| Hardness (Shore A) | points | 93 | 91 | 87 | 95 |
| Tensile Strength | psi | 3137 | 3026 | 2842 | 3549 |
| Elongation | percent | 367 | 421 | 333 | 431 |
| Elongation Set | percent | 13 | 12 | 10 | 55 |
| 300% Modulus | psi | 2196 | 1928 | 2460 | 2545 |
| Tear Strength (Die C) | PLI | 568 | 463 | 440 | 717 |

The compatibility of these four samples with the phosphate-ester hydraulic fluid "Pydraul 50-E" was tested by immersing specimens formed from the samples in the fluid for 168 hours at three different temperatures. The changes induced by this treatment are set forth in Table X.

Table X

| Test | Units or Symbol | Temperature (°C.) | Results Sample | | | |
|---|---|---|---|---|---|---|
| | | | J | K | L | M |
| Increase in Volume | percent | 20 | 9 | 4 | 3 | 4 |
| | | 70 | 36 | 18 | 17 | 14 |
| | | 100 | 47 | 37 | 37 | 24 |
| Decrease in Hardness (Shore A) | points | 20 | −2 | −1 | −1 | 0 |
| | | 70 | −7 | −4 | −2 | −3 |
| | | 100 | −9 | −5 | −3 | −4 |
| Loss of Tear Strength (Die C) | percent | 20 | −11 | 0 | −4 | −6 |
| | | 70 | −44 | −14 | −13 | −18 |
| | | 100 | −59 | −25 | 0 | −17 |

As may be seen in Table X, Samples K, L, and M all exhibit substantially improved resistance to attack by phosphate-ester hydraulic fluids compared to the control Sample J.

It is not intended to limit the present invention to the specific embodiments described above. For example, the composition of the present invention can be made in a one-shot process, and the polymerization reactions can be catalyzed with conventional catalysts such as tertiary amines or metallic catalysts. It is recognized that these and other changes may be made in the compositions and processes specifically described herein without departing from the scope and teachings of the instant invention, and it is intended to encompass all other embodiments, alternatives and modifications consistent with the present invention.

I claim:

1. An elastomeric polyurethane composition resistant to fluids containing phosphate esters; comprising the reaction product of:
   (a) 3,3'-dimethyl-4,4'-diphenyl diisocyanate;
   (b) a polyhydroxy compound selected from the group consisting of polycaprolactone polyols; and
   (c) a chain extender including an amount which is effective to provide resistance to fluids containing phosphate casters of a linear aliphatic compound defining a chain of carbon atoms, each end of the chain being attached to a hydroxyl group, and the chain having an unsaturated carbon-carbon bond.

2. The elastomeric polyurethane composition according to claim 1 in which the ratio of the effective equivalent weight of the linear aliphatic compound included in the chain extender to the equivalent weight of 3,3'-dimethyl-4,4'-diphenyl diisocyanate lies in the range of from about 0.3 to about 0.9.

3. The elastomeric polyurethane composition according to claim 1 in which the linear aliphatic compound included in the chain extender is selected from the group consisting of 1,4-dihydroxy-2-butene; 1,4-dihydroxy-2-butyne; and 1,4-dihydroxy-2,3-dibromo-2-butene.

4. The elastomeric polyurethane composition according to claim 3 in which the chain extender is a mixture of 1,4-butanediol and 1,4-dihydroxy-2,3-dibromo-2-butene.

5. The elastomeric polyurethane composition according to claim 3 in which the chain extender is 1,4-dihydroxy-2,3-dibromo-2-butene.

6. An elastomeric polyurethane composition resistant to fluids containing phosphate esters; comprising the reaction product of:
   (a) about 100 parts by equivalent weight of 3,3'-dimethyl-4,4'-diphenyl diisocyanate;
   (b) about 28 parts by equivalent weight of a polycaprolactone polyol; and
   (c) about 58 parts by equivalent weight of 1,4-dihydroxy-2,3-dibromo-2-butene.

7. An elastomeric polyurethane composition resistant to fluids containing phosphate esters; comprising the reaction product of:
   (a) about 100 parts by equivalent weight of 3,3'-dimethyl-4,4'-diphenyl diisocyanate;
   (b) about 28 parts by equivalent weight of a polycaprolactone polyol;
   (c) about 47 parts by equivalent weight of 1,4-dihydroxy-2,3-dibromo-2-butene; and
   (d) about 17 parts by equivalent weight of 1,4-butanediol.

8. In a hydraulic machine comprising: a fluid container, a hydraulic fluid containing a phosphate ester, and elastomeric means for sealing the container; the improvement consisting of elastomeric means for sealing the container made of a polyurethane composition resistant to hydraulic fluids containing a phosphate ester, the polyurethane composition comprising the reaction product of:
   (a) 3,3'-dimethyl-4,4'-diphenyl diisocyanate;
   (b) a polyhydroxy compound selected from the group consisting of polycaprolactone polyols; and
   (c) a chain extender including an amount which is effective to provide resistance to fluids containing phosphate casters of a linear aliphatic compound defining a chain of carbon atoms, each end of the chain being attached to a hydroxyl group, and the chain having an unsaturated carbon-carbon bond.

9. An elastomeric seal resistant to fluids containing phosphate esters, the seal being composed of an elastomeric polyurethane composition comprising the reaction product of:
   (a) about 100 parts by equivalent weight of 3,3'-dimethyl-4,4'-diphenyl diisocyanate;
   (b) about 28 parts by equivalent weight of a polycaprolactone polyol; and
   (c) about 58 parts by equivalent weight of 1,4-dihydroxy-2,3-dibromo-2-butene.

10. An elastomeric seal resistant to fluids containing phosphate esters, the seal being composed of an elastomeric polyurethane composition comprising the reaction product of:
    (a) about 100 parts by equivalent weight of 3,3'-dimethyl-4,4'-diphenyl diisocyanate;
    (b) about 28 parts by equivalent weight of a polycaprolactone polyol;
    (c) about 47 parts by equivalent weight of 1,4-dihydroxy-2,3-dibromo-2-butene; and
    (d) about 17 parts by equivalent weight of 1,4-butanediol.

* * * * *